United States Patent
Lamb

(10) Patent No.: US 9,436,612 B2
(45) Date of Patent: Sep. 6, 2016

(54) SIZING A WRITE CACHE BUFFER BASED ON EMERGENCY DATA SAVE PARAMETERS

(71) Applicant: International Business Machines Corporation, Armonk, NY (US)

(72) Inventor: Kirk D. Lamb, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/135,759

(22) Filed: Apr. 22, 2016

(65) Prior Publication Data

US 2016/0224445 A1    Aug. 4, 2016

Related U.S. Application Data

(63) Continuation of application No. 14/266,977, filed on May 1, 2014.

(51) Int. Cl.
*G06F 12/08*    (2016.01)
*G06F 11/30*    (2006.01)

(52) U.S. Cl.
CPC ....... *G06F 12/0866* (2013.01); *G06F 11/3055* (2013.01)

(58) Field of Classification Search
CPC ................ G06F 12/0866; G06F 11/3055
See application file for complete search history.

(56) References Cited

U.S. PATENT DOCUMENTS

| | | | | |
|---|---|---|---|---|
| 5,414,861 A * | 5/1995 | Horning | .................... | G06F 1/30 365/229 |
| 5,596,708 A * | 1/1997 | Weber | .................... | G06F 3/0601 714/42 |
| 2004/0054851 A1* | 3/2004 | Acton | .................. | G06F 11/1441 711/118 |
| 2006/0015683 A1* | 1/2006 | Ashmore | .............. | G06F 1/3203 711/113 |
| 2006/0072369 A1* | 4/2006 | Madter | ............... | G06F 12/0804 365/232 |
| 2006/0133181 A1* | 6/2006 | Amano | .................. | G11C 5/141 365/229 |
| 2006/0136765 A1* | 6/2006 | Poisner | ............... | G06F 11/1441 713/323 |
| 2007/0033433 A1 | 2/2007 | Pecone | | |
| 2008/0005474 A1 | 1/2008 | Long | | |

* cited by examiner

*Primary Examiner* — Edward Dudek, Jr.
(74) *Attorney, Agent, or Firm* — Cantor Colburn LLP; Margaret McNamara

(57) ABSTRACT

Embodiments relate to saving data upon loss of power. An aspect includes sizing a write cache buffer based on parameters related to carrying out this emergency data save procedure. A computer implemented method for allocating a write cache on a storage controller includes retrieving, at run-time by a processor, one or more operating parameters of a component used in a power-loss save of the write cache. The component is selected from the group consisting of an energy storage element, a non-volatile memory, and a transfer logic. A size for the write cache on the storage controller is determined, based on the one or more operating parameters. A write cache, of the determined size, is allocated from a volatile memory coupled to the storage controller.

1 Claim, 5 Drawing Sheets

SIZING A WRITE CACHE BUFFER BASED ON EMERGENCY DATA SAVE PARAMETERS

DOMESTIC PRIORITY

This application is a continuation of U.S. patent application Ser. No. 14/266,977, filed May 1, 2014, the content of which is incorporated by reference herein in its entirety.

BACKGROUND

The present invention relates generally to saving data upon loss of power, and more specifically, to sizing a write cache buffer based on parameters related to carrying out this emergency data save procedure.

Computer systems may use a storage controller as an intermediary between a host processor and permanent storage such as a disk subsystem. The host processor sends read and write transactions to the storage controller, and the storage controller in turn issues read and write commands to the permanent storage subsystem. A typical storage controller implements a write caching policy so that a write transaction is not always immediately passed on to the permanent storage subsystem, but is instead written to a write cache allocated from volatile storage such as dynamic read access memory (DRAM). At a later point in time, the storage controller issues a command to write the data from the write cache to the permanent storage subsystem.

SUMMARY

Embodiments include a method, device, and computer program product for allocating a write cache on a storage controller. A computer program product comprises a computer readable storage medium having program instructions embodied therewith. The computer readable storage medium is not a signal and the program instructions are readable by a processing circuit to cause the processing circuit to perform a method. The method includes retrieving, at run-time, one or more operating parameters of a component used in a power-loss save of the write cache. The component is selected from the group consisting of an energy storage element, a non-volatile memory, and a transfer logic. The method also includes determining a size for the write cache on the storage controller, based on the one or more operating parameters. The method also includes allocating the write cache, of the determined size, from a volatile memory coupled to the storage controller.

A computer implemented method includes retrieving, at run-time, one or more operating parameters of a component used in a power-loss save of the write cache. The component is selected from the group consisting of an energy storage element, a non-volatile memory, and a transfer logic. The method also includes determining a size for the write cache on the storage controller, based on the one or more operating parameters. The method also includes allocating the write cache, of the determined size, from a volatile memory coupled to the storage controller.

A storage controller device includes a volatile memory, a non-volatile storage, transfer logic configured to copy, upon a power loss, contents of a write cache in the volatile memory to the non-volatile storage; an instruction memory; and a processor, communicatively coupled to the instruction memory. The storage controller device is configured to perform a method that includes retrieving, at run-time, one or more operating parameters of a component used in a power-loss save of the write cache. The component is selected from the group consisting of an energy storage element, a non-volatile memory, and a transfer logic. The method also includes determining a size for the write cache on the storage controller, based on the one or more operating parameters. The method also includes allocating the write cache, of the determined size, from a volatile memory coupled to the storage controller.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

As noted above, conventional storage processors may implement write caching. Some conventional storage processors make this caching transparent to the host by reporting a successful write transaction back to the host processor once the data is written to volatile storage. To complement this transparent write caching, some conventional storage processors provide an emergency data save facility so that if no power is available to write to the permanent storage subsystem, cached data is temporarily stored in non-volatile storage. When power is restored, the storage processor copies the data from non-volatile storage to the permanent storage subsystem, thus putting stored data into the state expected by the host processor.

Since the emergency save procedure is invoked when the normal power supply has been interrupted, power for this emergency data save is provided by an energy storage element such as a capacitor. This amount of stored energy, along with the energy consumption rate during the save, sets a maximum limit on the amount of data that can be transferred from the write cache to non-volatile storage. Embodiments disclosed herein dynamically use operating parameters obtained at run-time to determine a maximum size of the write cache. Embodiments disclosed herein then allocate the write cache buffer to have this maximum size.

In some embodiments disclosed herein, the operating parameters are used to determine the energy consumption rate of the power-off save. The maximum size of the write cache is then determined using this dynamically determined energy consumption rate.

Figure 1:
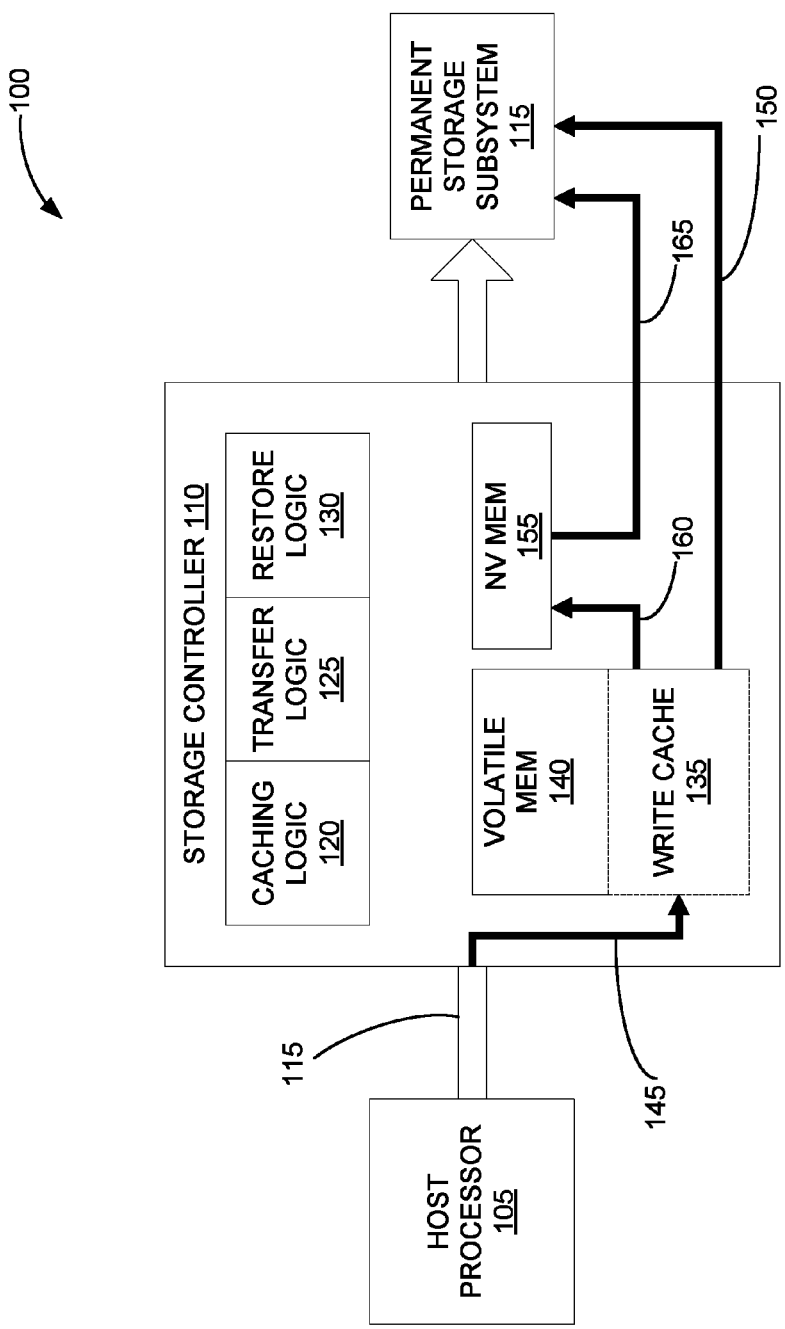
FIG. 1 depicts a computer system including a storage controller in accordance with an embodiment.

Turning now to FIG. 1, a block diagram of a computer system 100 is generally shown. The computer system 100 includes a host processor 105, a storage controller 110, and permanent storage subsystem 115. The permanent storage subsystem 115 may include more than one disk. In such embodiments, the storage controller 110 may handle more than one disk. In multi-disk embodiments, the storage controller 110 may use the disks to provide redundancy features, such as those known as Redundant Array of Inexpensive Disks (RAID).

The functionality of storage controller 110 is divided into blocks such as caching logic 120, transfer logic 125, and restore logic 130. A person of ordinary skill in the art will appreciate that the storage controller 110 may include other blocks for other functions. In embodiments in which the storage controller 110 includes a processor that executes instructions, these logic blocks may correspond to software, i.e., sections of code. In other embodiments, the logic blocks may be implemented as specialized circuits of logic gates.

The caching logic 120 handles caching of writes from the host processor 105. That is, when the host processor 105 sends a write transaction to the storage controller 110, the storage controller 110 writes the host data to a write cache 135. The write cache 135 resides in volatile memory 140, which take the form of dynamic random access memory (DRAM). This sequence is denoted with arrow 145 in FIG. 1. At a later point in time, the storage controller 110 issues a write command to the permanent storage subsystem 115 to copy data stored in the write cache 135 to the permanent storage subsystem 115. This sequence is denoted with arrow 150 in FIG. 1.

The transfer logic 125 detects a loss of power to the storage controller 110 and upon power loss, copies any data still in the write cache 135 to non-volatile memory 155. This sequence is denoted with arrow 160 in FIG. 1. As noted above, power for this sequence is provided by an energy storage element. In some embodiments, the energy storage element takes the form of an ultracapacitor, also known as a supercapactior. In other embodiments, the energy storage element takes the form of a battery.

The restore logic 130 is invoked when power is restored. At that time, the restore logic 130 issues write commands to write the data in the non-volatile memory 155 to the permanent storage subsystem 130. This sequence is denoted with arrow 165 in FIG. 1. A person of ordinary skill in the art should understand that other state information necessary to carry out this write sequence is also stored in the non-volatile memory 155. For example, each write transaction processed by the restore logic 130 may be associated with a starting address in the non-volatile memory 155, an amount of data to be written, and information related to the target disk (e.g., disk id, location on disk, etc.)

Having described, at a high level, the overall operation of write operations in computer system 100, the allocation of the write cache 135 will now be discussed in more detail. As described herein, allocation of a buffer to be used as the write cache 135 is performed by the caching logic 120. However, a person of ordinary skill in the art will understand that this is merely one way of partitioning functionality, and that this allocation could also be performed by another portion of the storage controller 110. The caching logic 120 must allocate a buffer for the write cache 135 before any write caching occurs. Allocation of the write cache buffer may occur as part of an initialization sequence performed by the storage controller 110. In some embodiments, allocation of this buffer is performed once, at power-up. In other embodiments, this allocation is performed periodically, allowing the size of the write cache 135 to be changed dynamically at run-time.

Figure 2:
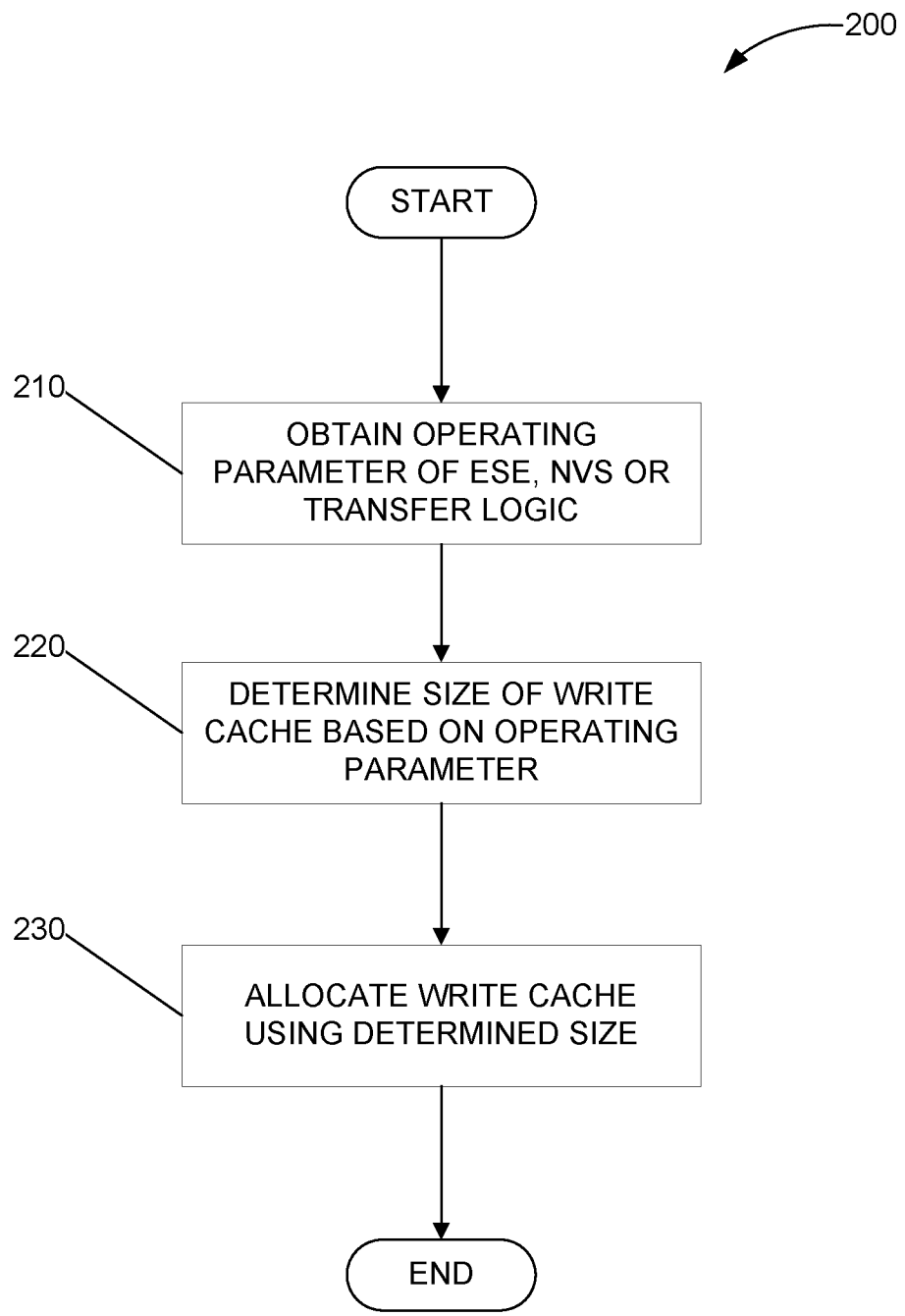
FIG. 2 depicts a process flow for sizing and allocating a write cache in a storage controller in accordance with an embodiment.

Turning now to FIG. 2, a flow chart of a process 200 for sizing and allocating the write cache 135 is generally shown. As noted above, the transfer logic 125 moves data from the write cache 135 to the non-volatile memory 155 upon loss of power. The maximum limit on the amount of data that can be transferred depends on the amount of stored energy available to the storage controller 110, the data transfer rate of the non-volatile storage, and the energy consumption rate (ECR) of the transfer logic 125.

Each of these factors corresponds to, or is derived from, operating parameters of energy storage component, the non-volatile storage, and the transfer logic 125. At block 210, the caching logic 120 retrieves one or more of these operating parameters from system configuration data. In some embodiments, the retrieved parameter is the energy capacity of the energy storage element. In some embodiments, the retrieved parameter is the data transfer rate of the non-volatile memory 155. In some embodiments, the retrieved parameter is the power consumption of the transfer logic 125.

At least one of these operating parameters is instance-specific. An instance-specific parameter is one that is not common to all instances of the component, but is instead specific to the particular component installed in the storage controller 110. Instance-specific parameters for a device may be obtained, for example, by reading from a predefined memory or I/O location (sometimes referred to as "bin data").

As one example, some embodiments of the transfer logic 125 are implemented as an application specific integrated circuit (ASIC). While the transfer logic 125 on any of these ASICs is specified to operating in a particular frequency range, an individual ASIC (referred to sometimes as a "part") may be able to run at the high or low (fast or slow) end of that range, depending on the process speed. Process speed is thus is an example of an instance-specific parameter.

This process speed affects the ASIC's power consumption because for a given frequency, a fast process part can run at that frequency using a lower voltage than a slow process part. Also, fast process ASICs have higher leakage current than slow process ASICs. However, fast process ASICs can run at lower voltage, so this power is somewhat reduced relative to the slow process ASICs. Also, the fast process ASIC consumes less switching power, because switching power is a function of frequency, capacitance, and the square of voltage. When frequency is fixed, capacitance is close to constant across the process, and the voltage is lower. In any case, for a fixed frequency ASIC, the energy consumption rate of the fast and slow part would differ even when the data transfer rate is the same (due to the fixed frequency). In a variable frequency ASIC, the fast process parts run at a faster frequency than the slow process part, given a fixed voltage. Thus, for a variable frequency ASIC, both the data transfer rate and the energy consumption rates would differ according to process speed.

With regard to parameters for the non-volatile memory 155, the data transfer speed may be a parameter that is common to all memory devices of a certain type (e.g., a specific type of NAND flash), or maybe instance-specific to a particular batch of memory devices.

Having obtained an operating parameter at block 210, at block 220 the caching logic 120 uses the operating parameter to determine an appropriate size for the write cache 135, one that will allow the transfer logic 125 to copy the entire cache to the non-volatile memory 155 given the capacity of the energy storage element. The size is calculated as the energy capacity of the non-volatile memory 155 multiplied by the data transfer rate of the non-volatile memory 155, divided by the energy consumption rate (ECR) of the transfer logic 125. As noted above, at least one of these factors is an operating parameter retrieved at run-time by the storage controller 110. Retrieving parameters at run-time allows the storage controller 110 to customize the size of the write cache 135 for the actual hardware, rather than relying on worst case assumptions about the behavior of the components involved in the power-loss save of the write cache 135. Using instance-specific values of the operating parameters allows even more customization.

At block 230, the caching logic 120 allocates a portion of the volatile memory 140, having the size calculated at block 220, to serve as the write cache 135. Persons of ordinary skill in the art should appreciate that various techniques are available for allocating a buffer from a particular region or type of memory, depending on the platform. For example, some operating systems provide an alloc( ) function in which the caller specifies that the allocated buffer should come from a particular memory region rather than from the general-purpose heap. Other operating systems provide a map function that allows the caller to map a particular region (i.e., starting address and size) of physical memory to a logical address usable by software. At block 240, the caching logic 120 handles caching of write transactions from the host processor 105, using various techniques known to persons of ordinary skill in the art. At block 250, upon receipt of a power-loss indication, the transfer logic 125 copies the contents of the write cache 135 to non-volatile memory 155. At block 260, the restore logic 130 reads from the non-volatile memory 155 and issues write commands to the permanent storage subsystem 115. As noted earlier in the system-level discussion of FIG. 1, additional state information may be saved during the power-loss save (block 250) so that various portions of the non-volatile memory 155 are written to the correct location of the correct target disk.

Figure 3:
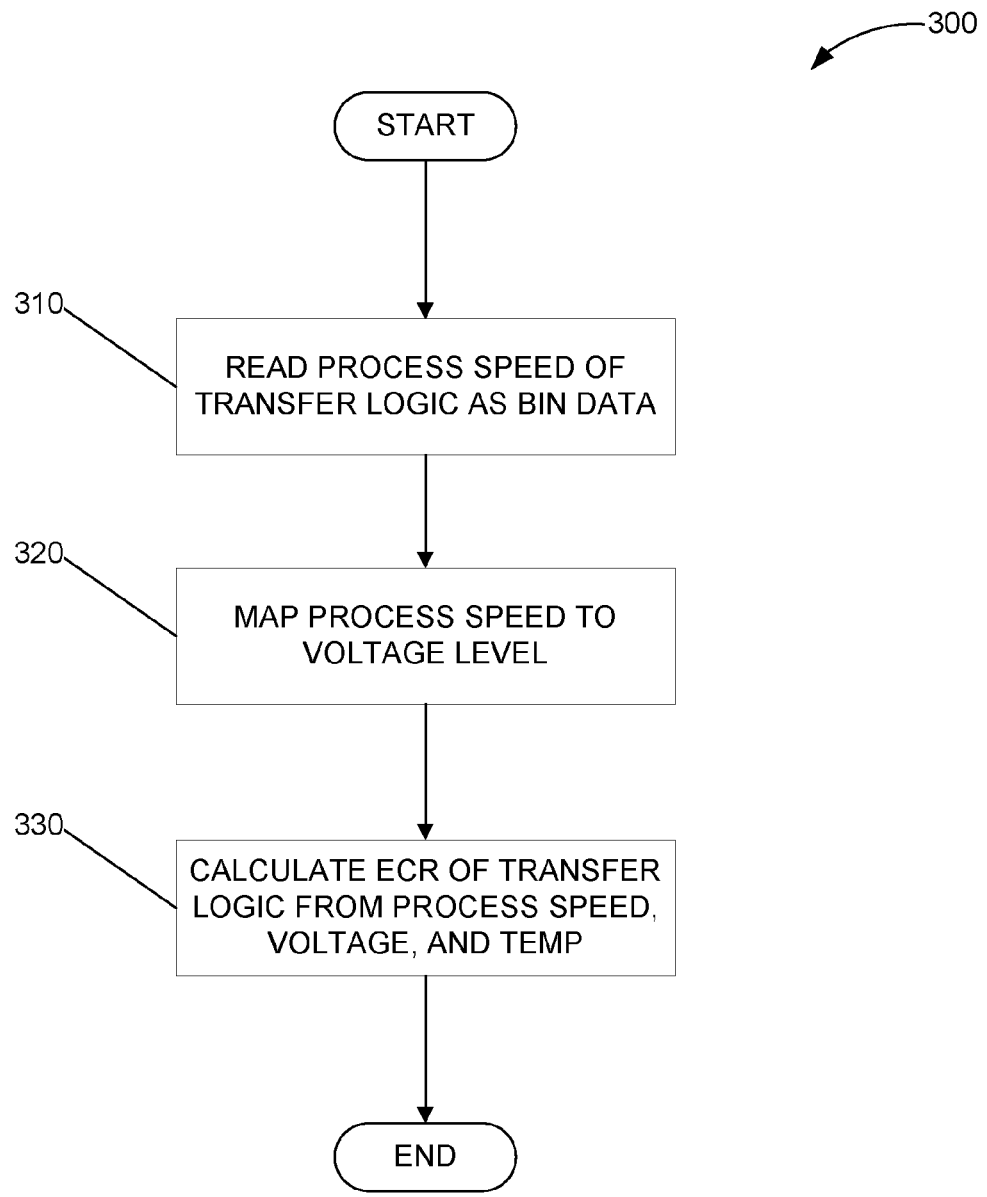
FIG. 3 depicts a process flow for determining an energy consumption rate during an emergency data save, in accordance with an embodiment.

Turning now to FIG. 3, a flow chart of a process 300 for determining the energy consumption rate (ECR) of the transfer logic 125 is generally shown. At block 310, the caching logic 120 reads the process speed of the transfer logic 125 as bin data. At block 320, the caching logic 120 uses a predefined mapping to get from process speed to a voltage level. At block 330, the caching logic 120 calculates the ECR of the transfer logic 125 from voltage, process speed, and temperature of the transfer logic 125. The caching logic 120 may, for example, perform a calculation based on a fixed relationship between these three values, or may use a table look-up. Some embodiments use a fixed temperature value corresponding to the maximum allowed temperature of the storage controller 110. Others use a temperature sensor to read a current temperature of the transfer logic 125. Still other embodiments sense the temperature of the storage controller 110, which includes the transfer logic 125 as well as additional logic and components.

Some embodiments of the storage controller 110 may have multiple frequency and/or voltage domains. The following pseudocode illustrates a calculation of energy consumption rate, and then of write cache size, that takes into account multiple frequency and voltage domains of the storage controller 110.

Figure 4:
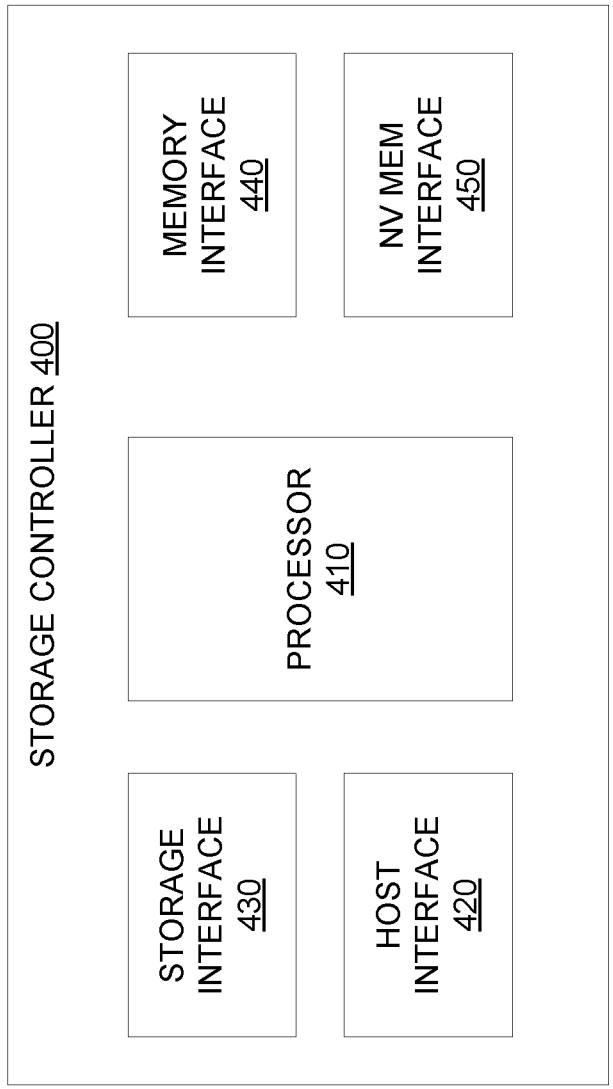
FIG. 4 depicts a storage controller device in accordance with an embodiment.

ESE=ProductDataRead(ESE_Loc);
DTR=ProductDataRead(DTR_Loc);
ECR=0;
Foreach vi of all_voltage_domains {
   foreach fj of all_freq_domains {
   cij=MapCapacitanceConstant(vi, fj);
   active_powerij=fj*cij*vi**2;
   leakage_powerij=MapLeakagePower(vi, fj);
   ECR=ECR+activepowerij+leakage_powerij;
   }
}
WriteCacheSize=ESE*(1/ECR)*DTR;

Turning now to FIG. 4, a block diagram of the storage controller 110 is generally shown. The storage controller 110 includes a processor 410, a host interface 420, a storage interface 430, a memory interface 440, and a non-volatile memory interface 450. The processor 410 communicates with the host processor 105 through the host interface 420 to receive write commands or transactions from the host processor 105. Using the memory interface 440, the processor 410 writes data provided by the host to the write cache 135 residing in the volatile memory 140. At a later time, the processor 410 writes data from the write cache 135 to the permanent storage subsystem 115 through the storage interface 430. If loss of power is detected through signal 460, the processor 410 copies the contents of the write cache 135 to the non-volatile memory 155 over the non-volatile memory interface 450. Once power is restored, the processor 410 issues write transactions to the permanent storage subsystem 115 to commit the data in non-volatile memory 155 to permanent storage.

As should be understood by a person of ordinary skill in the art, the storage controller 110 may be implemented using a variety of technologies. In one embodiment, the processor 410 is implemented as a microprocessor or microcontroller and the interfaces are implemented as specialized logic blocks (e.g., one or more ASICs). In another embodiment, the processor 410 is also incorporated into the ASIC. In other embodiments, the storage controller 110 is implemented as a System on Chip (SoC).

Technical effects and benefits include determining a maximum size for a storage controller's write cache buffer that is tailored for the particular components of the storage controller. Sizing that takes into account the specific configuration of the storage controller is preferable to conventional solutions which make worst case assumptions about these components. For example, assuming the highest energy consumption during the power-off save procedure results in a smaller write cache buffer, and thus reduced performance.

Embodiments disclosed herein include a computer program product for allocating a write cache on a storage controller. The computer program product comprises a computer readable storage medium having program instructions embodied therewith. The computer readable storage medium is not a signal. The program instructions are readable by a processing circuit to cause the processing circuit to perform a method that includes retrieving, at run-time, one or more operating parameters of a component used in a power-loss save of the write cache. The component is selected from the group consisting of an energy storage element, a non-volatile memory, and a transfer logic. The method also includes determining a size for the write cache on the storage controller, based on the one or more operating parameters. The method also includes allocating the write cache, of the determined size, from a volatile memory coupled to the storage controller. In addition to one or more of the features described above, or as an alternative, in further embodiments the component corresponds to the transfer logic and the one or more operating parameters corresponds to a power consumption of the transfer logic, and/or the component corresponds to the transfer logic and the one or more operating parameters corresponds to a process speed of the transfer logic. In further embodiments, the process speed is retrieved as bin data. In further embodiments, the determination of the size for the write cache on the storage controller is based on an energy consumption rate of the transfer logic, and this determination further includes determining a voltage of the transfer logic from the process speed, and calculating the energy consumption rate of the transfer logic from the determined voltage and the process speed. In further embodiments, the calculation of the energy consumption rate also uses a current temperature of the transfer logic. In further embodiments, the component corresponds to the energy storage element and the one or more operating parameters corresponds to an energy capacity of the energy storage element. In further embodiments, the component corresponds to the non-volatile memory and the one or more operating parameters corresponds to a data transfer rate of the non-volatile memory.

Embodiments disclosed herein include a computer implemented method for allocating a write cache on a storage controller. The method includes retrieving, at run-time, one or more operating parameters of a component used in a power-loss save of the write cache. The component is selected from the group consisting of an energy storage element, a non-volatile memory, and a transfer logic. The method also includes determining a size for the write cache on the storage controller, based on the one or more operating parameters. The method also includes allocating the write cache, of the determined size, from a volatile memory coupled to the storage controller. In addition to one or more of the features described above, or as an alternative, in further embodiments the component corresponds to the transfer logic and the one or more operating parameters corresponds to a power consumption of the transfer logic, and/or the component corresponds to the transfer logic and the one or more operating parameters corresponds to a process speed of the transfer logic. In further embodiments, the process speed is retrieved as bin data. In further embodiments, the determination of the size for the write cache on the storage controller is based on an energy consumption rate of the transfer logic, and this determination further includes determining a voltage of the transfer logic from the process speed, and calculating the energy consumption rate of the transfer logic from the determined voltage and the process speed. In further embodiments, the calculation of the energy consumption rate also uses a current temperature of the transfer logic. In further embodiments, the component corresponds to the energy storage element and the one or more operating parameters corresponds to an energy capacity of the energy storage element. In further embodiments, the component corresponds to the non-volatile memory and the one or more operating parameters corresponds to a data transfer rate of the non-volatile memory. In further embodiments the calculating of the energy consumption rate accounts for multiple voltage domains of the storage controller. In further embodiments the calculating of the energy consumption rate accounts for multiple frequency domains of the storage controller.

Embodiments disclosed herein include a storage controller device. The storage controller device includes a volatile memory, a non-volatile storage, transfer logic configured to copy, upon a power loss, contents of a write cache in the volatile memory to the non-volatile storage; an instruction memory; and a processor, communicatively coupled to said instruction memory. The storage controller is configured to perform a method that includes retrieving, at run-time, one or more operating parameters of a component used in a power-loss save of the write cache. The component is selected from the group consisting of an energy storage element, a non-volatile memory, and a transfer logic. The method also includes determining a size for the write cache on the storage controller, based on the one or more operating parameters. The method also includes allocating the write cache, of the determined size, from a volatile memory coupled to the storage controller. In addition to one or more of the features described above, or as an alternative, in further embodiments the component corresponds to the transfer logic and the one or more operating parameters corresponds to a power consumption of the transfer logic, and/or the component corresponds to the transfer logic and the one or more operating parameters corresponds to a process speed of the transfer logic. In further embodiments, the process speed is retrieved as bin data. In further embodiments, the determination of the size for the write cache on the storage controller is based on an energy consumption rate of the transfer logic, and this determination further includes determining a voltage of the transfer logic from the process speed, and calculating the energy consumption rate of the transfer logic from the determined voltage and the process speed. In further embodiments, the calculation of the energy consumption rate also uses a current temperature of the transfer logic. In further embodiments, the component corresponds to the energy storage element and the one or more operating parameters corresponds to an energy capacity of the energy storage element. In further embodiments, the component corresponds to the non-volatile memory and the one or more operating parameters corresponds to a data transfer rate of the non-volatile memory. In further embodiments the storage controller includes an application specific integrated circuit (ASIC) and the transfer logic resides on the ASIC. In further embodiments the retrieving reads the one or more operating parameters from a stored system configuration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 5:
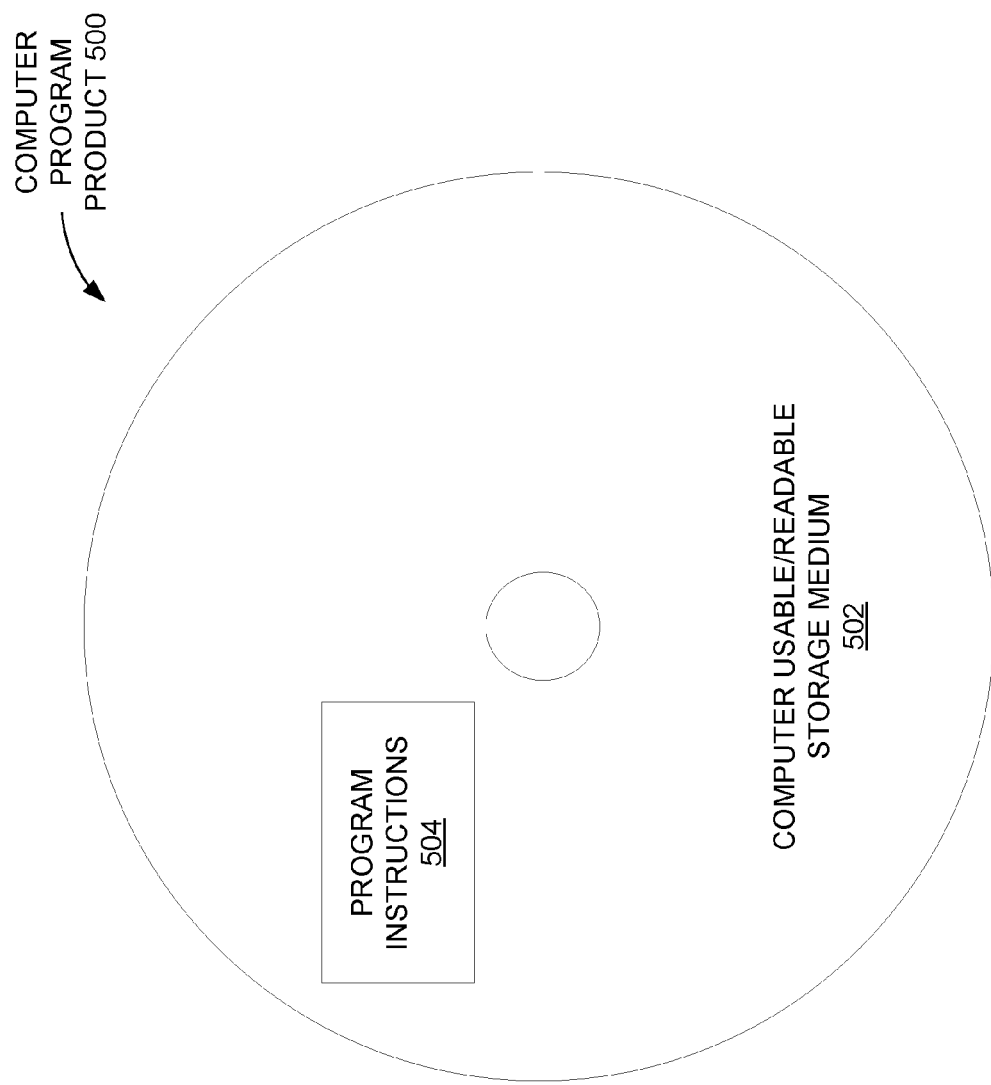
FIG. 5 depicts a computer-readable medium according to an embodiment.

Referring now to FIG. 5, a computer program product 500 in accordance with an embodiment that includes a computer readable storage medium 502 and program instructions 504 is generally shown. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A storage controller device, the storage controller device comprising:
  a volatile memory;
  a non-volatile storage;
  an application specific integrated circuit (ASIC);

transfer logic residing on the ASIC, the transfer logic configured to copy, upon a power loss, contents of a write cache in the volatile memory to the non-volatile storage;

an instruction memory; and a processor, communicatively coupled to said instruction memory, the storage controller configured to perform a method comprising:

retrieving, at run-time, one or more operating parameters of the transfer logic, the one or more operating parameters including an instance-specific process speed of the transfer logic, wherein the instance-specific process speed is retrieved as bin data;

determining a voltage of the transfer logic based on the instance-specific process speed of the transfer logic;

calculating an energy consumption rate of the transfer logic during the copy upon power loss, wherein the calculating is based on the voltage, a current temperature of the transfer logic and the one or more operating parameters that are retrieved at run-time;

determining a size for the write cache in the volatile memory, based on the energy consumption rate and an amount of energy in an energy storage element that powers the copy upon power-loss; and allocating the write cache, of the determined size, from the volatile memory.

* * * * *